United States Patent [19]

Leitgeb

[11] 4,256,469

[45] Mar. 17, 1981

[54] REPRESSURIZATION TECHNIQUE FOR PRESSURE SWING ADSORPTION

[75] Inventor: Paul Leitgeb, Munich, Fed. Rep. of Germany

[73] Assignee: Linde Aktiengesellschaft, Wiesbaden, Fed. Rep. of Germany

[21] Appl. No.: 957,783

[22] Filed: Nov. 6, 1978

[51] Int. Cl.³ .................................... B01D 53/04
[52] U.S. Cl. ................................ 55/25; 55/62; 55/68; 55/75
[58] Field of Search .............. 55/25, 26, 58, 62, 68, 55/74, 75

[56] References Cited

U.S. PATENT DOCUMENTS

| | | | |
|---|---|---|---|
| 3,176,444 | 4/1965 | Kiyonaga | 55/26 |
| 3,738,087 | 6/1973 | McCombs | 55/58 |
| 3,801,513 | 4/1974 | Munzner et al. | 55/75 X |
| 3,923,477 | 12/1975 | Armond et al. | 55/25 |
| 4,011,065 | 3/1977 | Munzner et al. | 55/25 |

FOREIGN PATENT DOCUMENTS 1480866  7/1977  United Kingdom ............ 55/58

Primary Examiner—Robert H. Spitzer
Attorney, Agent, or Firm—Millen & White

[57] ABSTRACT

In a pressure swing adsorption process, the adsorbent being for example a carbon molecular sieve, the usual initial surge of an undesired component, e.g., $O_2$ in a nitrogen stream, from the outlet of a freshly repressurized adsorber, is reduced or eliminated by conducting repressurization in a stage-wise manner with the final part of the repressurization being conducted substantially more slowly than the initial stage of repressurization.

17 Claims, 3 Drawing Figures

REPRESSURIZATION TECHNIQUE FOR PRESSURE SWING ADSORPTION

CROSS REFERENCE TO RELATED APPLICATION

The application entitled "Adsorption Process for the Separation of a Gaseous Mixture", Ser. No. 957,955, filed contemporaneously by the same inventor contains details regarding an improvement in desorption when using carbon molecular sieves.

BACKGROUND OF THE INVENTION

This invention relates to a pressure swing adsorption process for the separation of a gaseous mixture, and in particular to a process where a gaseous mixture, under pressure, is conducted over an adsorbent capable of adsorbing at least one component of the gaseous mixture selectively over the other components, and in this way a gaseous stream enriched in one or several other components is recovered at the outlet. The pressure above the adsorbent is then lowered for regenerating purposes so as to liberate a gaseous stream enriched in adsorbed component. The pressure above the adsorbent is then increased and the cycle is repeated. This invention is especially suitable in processes where the adsorbent is a carbon molecular sieve.

Carbon molecular sieves have the particular advantage over other molecular sieves, such as zeolitic sieves, that they are not adversely affected by the presence of water and $CO_2$ in the mixture to be treated. In comparison, other sieves are provided with upstream adsorbents, such as, for example, silica gel or activated carbon to free the gaseous mixture from water and $CO_2$, which impurities occur in most technical and natural gaseous mixtures. With carbon molecular sieves, the desorption step results in the removal of these undesirable components along with the other adsorbed components.

A conventional process of this type has been described in DOS [German Unexamined Laid-Open Application] No. 2,441,447 (U.K. Pat. No. 1,480,866). In this process, a nitrogen-enriched stream is obtained by passing air under pressure over the carbon molecular sieve and withdrawing the nitrogen-enriched gas at the outlet end of the adsorber. Once the oxygen content of the discharged gas has reached a specific, previously determined maximum value, the air feed to this adsorber is interrupted, and the gas present in the adsorbent and in the interstices, having an oxygen content higher than that of air, is removed by suction with the aid of a vacuum pump; in this connection, it is desirable to lower the pressure down to at least 100 torr [mm Hg], and most preferably down to 20–70 torr.

To repressurize a regenerated adsorber to the adsorption pressure, the evacuated adsorber, in the conventional process, is first connected to a loaded adsorber and brought into pressure equalization therewith. After pressure equalization has been accomplished, the pressure in the desorbed adsorber is elevated to the adsorption pressure by introducing another gas with the aid of a pump.

In said conventional process, the duration of an adsorption cycle ranges from 40 to 80 seconds; the duration of the pressure equalizing step is between 2 and 3 seconds, and the duration of pressure increase until the final pressure has been reached is in the range from 4 to 6 seconds.

Even prior to said conventional process, the observation had been made that during the separation of air into its components, after desorption and after pressure buildup, the first product nitrogen fraction discharged from an adsorber contains substantially more oxygen than would actually have been expected from a freshly regenerated adsorber. To counteract this undesirable effect and to avoid an initial $O_2$ surge, the pressure buildup to the adsorption pressure is effected in the conventional process with a portion of the residual gas discharged from another adsorber, i.e., a gas having an $N_2$ content higher than that of air.

However, it has been found that even this measure cannot control the relatively high initial oxygen concentration to the desired extent. Besides, this procedure requires a second absorber pair connected downstream of the system.

SUMMARY OF THE INVENTION

An object of this invention is to provide an improved adsorption process for the separation of gaseous mixtures into their components.

A particular object is to provide a pressure swing adsorption process for the separation of air so as to obtain an enriched nitrogen stream without an initial oxygen surge at the beginning of the adsorption stage.

Another object is to provide an improved adsorption process based on a carbon molecular sieve as the adsorbent.

Upon further study of the specification and appended claims, further objects and advantages of this invention will become apparent to those skilled in the art.

To attain these objects, the repressurization step after regeneration is conducted in at least two stages, wherein the pressure buildup in the first stage or stages to an intermediate pressure is effected rapidly, and the pressure buildup in the last stage to the adsorption pressure is effected substantially more gradually.

Thus, contrary to conventional operation, the pressure buildup (repressurization) after desorption of the previously adsorbed components is not conducted with maximum speed to attain the full delivery pressure for the product gas in a minimally short period of time. Rather, the pressure buildup in the last pressure-elevating stage of the repressurization step is delayed substantially so that the last pressure-elevating stage may take, for example, four times as long as the preceding pressure-elevating stage or stages. In the extreme case, provision is even made in accordance with this invention to attain the full adsorption pressure only toward the end of the adsorption phase.

For, it has been discovered that, a rapid pressure increase after desorption to the full adsorption pressure is the cause for the discharge from the adsorber outlet, at the beginning of an adsorption cycle, of gases substantially more enriched in the preferably adsorbed component or components than would actually have been expected. This phenomenon is pronounced with carbon molecular sieves due to the fact that in the conventional system of gas/carbon molecular sieve, there is insufficient time during a pressure buildup which lasts merely a few seconds, to approach the equilibrium condition, so that smaller quantitites of adsorbable components are in fact adsorbed than previously believed. Conversely, with a slower repressurization step, a closer approach to equilibrium is attained.

This invention is applicable to all processes irrespective of the particular desorption or adsorption pressure. For example, the desorption can be effected approximately at atmospheric pressure, or at sub-atmospheric pressure, e.g., down to 20 torr.

The process of this invention can be utilized with special advantage in the adiabatic pressure change to short-term adsorption processes presently employed in many instances, wherein the cycle period is approximately in the range of 50, 100, or 200 seconds.

The process of this invention can be utilized for all gaseous mixtures, the components of which exhibit a differing adsorbability on carbon molecular sieves. Likewise, the process is applicable to all adsorbents and processes wherein not more than 70%, especially not more than 55%, equilibrium of the adsorbed component has been previously attained during the repressurization step.

Once it is appreciated that it is necessary to conduct the repressurization at a sufficiently slow rate or to approach equilibrium, especially at least 70%, particularly at least 80% equilibrium, it will be realized that merely extending the time period for repressurization can be used to accomplish this goal. However, the multi-stage repressurization of this invention is especially efficient for solving the problem, the preferred percentage breakdown for each stage being indicated as follows, the basis being the total time required for repressurizing from the final desorption pressure to the maximum adsorption pressure.

| Stage 1) | 40 to 70%, especially 50 to 65%, of the pressure in 3 to 10% of the total time. |
|---|---|
| Stage 2) | 70 to 100%, especially 65 to 100% of pressure in 30 to 85%, especially 50 to 85% of the total time. At the end of the third stage, the final adsorption pressure and end of the repressurization time is reached. |

The process of the present invention is particularly applicable to air fractionation, especially with the object of obtaining nitrogen-enriched gas having a residual oxygen content of down to 0.1 vol.-%, e.g., 5 to 0.1% $O_2$. Nitrogen of such a purity can be used in technology for a great variety of applications. It is employed, for example, to flush oil tanks, gasoline tanks, tar tanks, or methane tanks. Furthermore, this nitrogen can be employed in chemical processes as a gaseous barrier or diluent to avoid the formation of explosive mixtures between gaseous components from a process and air. Likewise, nitrogen of such a purity can be used as a diluent for adjusting the thermal value of a natural gas mixture, i.e., for conditioning natural gas. Another well known use for this quality nitrogen lies in the food industry: preservation purposes, dispensing of beer, etc.

By using the process according to this invention, it is possible, at the same rate of production, to attain substantially lower contents of more readily absorbable components in the product gas than with the use of conventional processes. Alternatively, the rate of production can be increased greatly with the purities remaining the same as prior art purities, all other things being equal. As known, the rate of production can also be increased with increasing adsorption pressure. Generally, the adsorption pressure is in the range of 2 to 14, especially 4 to 10 bar. Thus, in general, the extent of repressurization in bars is usually about 1.9 to 13.9, particularly 3.9 to 9.9 bars. It is also contemplated that the repressurization will occur in about 5 to 60, especially 30 to 60 seconds in total.

The pressure increase in the first pressure buildup stage is preferably effected in the process of this invention by connecting a desorbed, optionally evacuated adsorber with a loaded adsorber which is under pressure. It is advantageous to conduct this pressure equalization via the outlet ends of both adsorbers, so that a residual charge of more readily adsorbable components present in the proximity of the outlet end of the adsorber to be pressurized will be shifted in the direction toward the inlet side, which contributes toward an increase in product purity.

However, it is even somewhat more advantageous to connect, for the purpose of pressure equalization, the inlet and outlets ends of a pressurized adsorber and a desorbed adsorber with each other, since in this way the fill gas from the inlet of pressurized adsorber, richer in the more readily adsorbable component, passes to the inlet end of the other adsorber; and the gas from the outlet of the pressurized adsorber already extensively depleted of the more readily adsorbable components passes into the outlet end of the other adsorber, so that at this outlet end the load of the adsorbent with more readily adsorbable components is even more greatly reduced than in case of the process variant described hereinabove.

The process of this invention has the advantage that there is no need to provide a gas which has already been previously enriched in certain components for the pressurizing step in the last pressure-increasing stage and optionally also is preceding pressure-increasing stages, but that, rather, the gas to be separated can be directly utilized for the pressure increase. In this way, storage vessels for gaseous fractions to be specifically collected become unnecessary.

Another advantage of the process of this invention resides in that by the use of the feed gas for the pressure increase in the last stage, a product stream is already obtained even though the full adsorption pressure has not as yet been attained. In a special aspect of the process of this invention the full adsorption pressure is not even reached until toward the end of the adsorption cycle.

Details of carbon molecular sieves are described in U.S. Pat. No. 3,801,513.

DETAILED DESCRIPTION

Figure 1:
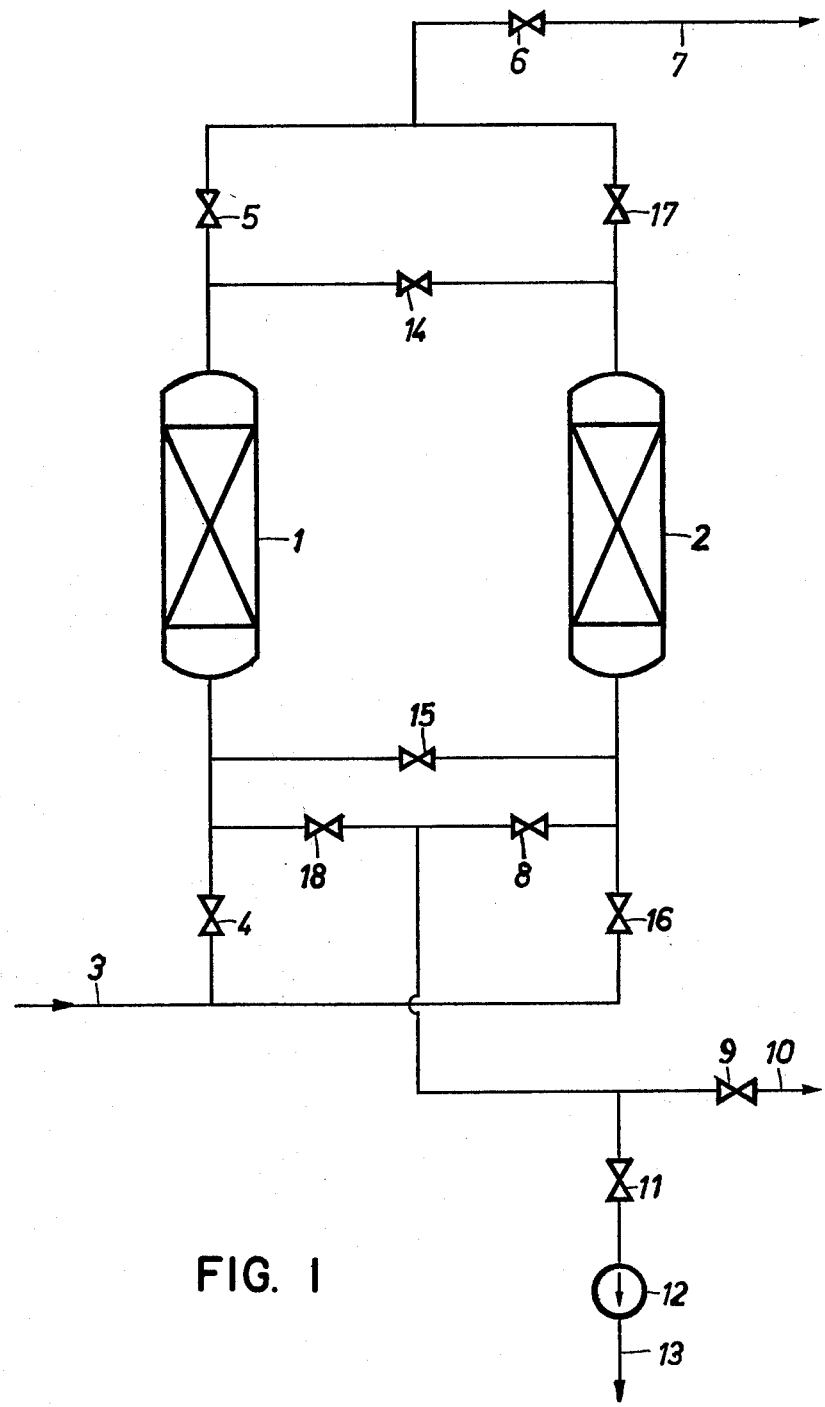
FIG. 1 is a schematic illustration of twin adsorber apparatus for conducting the process of this invention.

In FIG. 1, numeral 1 and 2 denote two reversing adsorbers provided with respectively 700 g. of carbon molecular sieve. Air is fed to the plant under pressure via conduit 3. The air contains the usual concentrations of $CO_2$ and $H_2O$. By opening valve 4, the air passes into the adsorber 1, where the adsorbent adsorbs $O_2$, $CO_2$ and $H_2O$, and small amounts of $N_2$ and Ar. By opening valves 5 and 6, a nitrogen stream can be withdrawn from conduit 7, this stream containing only a few percent or fractions of percent of oxygen at this point.

During the time period, the adsorber 2 is regenerated. For this purpose, the valves 8 and 9 are opened, and a mixture of the previously adsorbed components, i.e., a mixture of $O_2$, Ar, $N_2$, $H_2O$ and $CO_2$, is discharged via conduit 10. Once the pressure in adsorber 2 has dropped to atmospheric pressure, valve 9 is closed and valve 11 is opened so that with the aid of vacuum pump 12 the pressure in adsorber 2 can be even further lowered. In this case, essentially a similar gaseous mixture passes through conduit 13 as has been previously discharged from conduit 10.

Once the adsorber 2 has been adequately regenerated, valves 8 and 11 are closed again, and the same holds true for valves 4, 5 and 6, whereupon by opening valves 14 and 15 a pressure equalization is carried out between the two adsorbers. If the pressure in both adsorbers is the same, valves 14 and 15 are closed and the adsorber 2 is pressurized with compressed air via conduit 3 and opened valve 16 to a pressure which is essentially lower than the final adsorption pressure, so that when subsequently valve 17 and valve 6 are opened, product gas can again be withdrawn via conduit 7, with the adsorption pressure being further increased.

The further regeneration of the adsorber 1 then takes place analogously as that of adsorber 2 by opening valve 18 via valves 9 and 11, respectively.

The following Tables I and II set forth a number of numerical valves resulting from measurements, using the apparatus illustrated in FIG. 1.

Table I shows only values in processes wherein the desorption pressure was equal to atmospheric pressure, while Table II shows values at a desorption pressure of below 1 bar.

As can be seen from the tables, it is possible with the process of this invention to attain very high product purities, for example in the case of air separation with the objective of obtaining nitrogen, a purity of $N_2$ containing only 0.2 vol.-% oxygen.

It can also be seen from the tables that the product yield rises with decreasing purity of the product.

Figure 2:
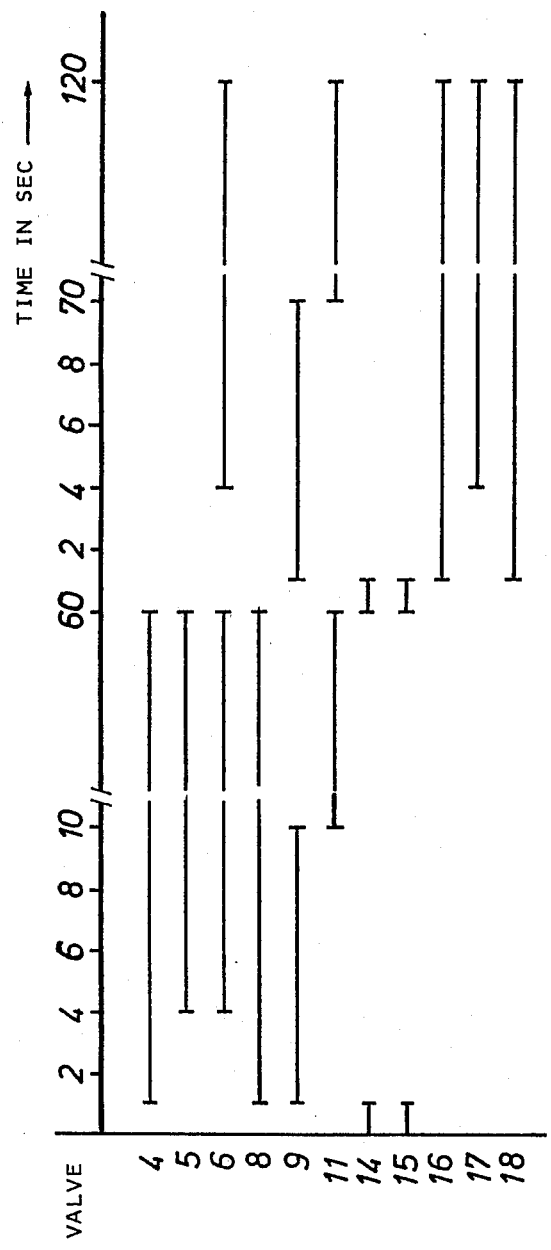
FIG. 2 is a time program depicting the switching sequence of the solenoid valves illustrated in FIG. 1 and the cyclic sequence of the two adsorbers.

FIG. 2 shows the switching sequence of the solenoid valves shown in FIG. 1 and the cycle sequence of the individual adsorbers. The duration of a total cycle is 120 seconds. This time period is plotted horizontally. The individual valves are located on the ordinate; their open times are marked by horizontal, straight lines. In the lower portion of FIG. 2, the cyclic sequence of adsorbers 1 and 2 taking place within the indicated time period of 120 seconds is illustrated.

Figure 3:
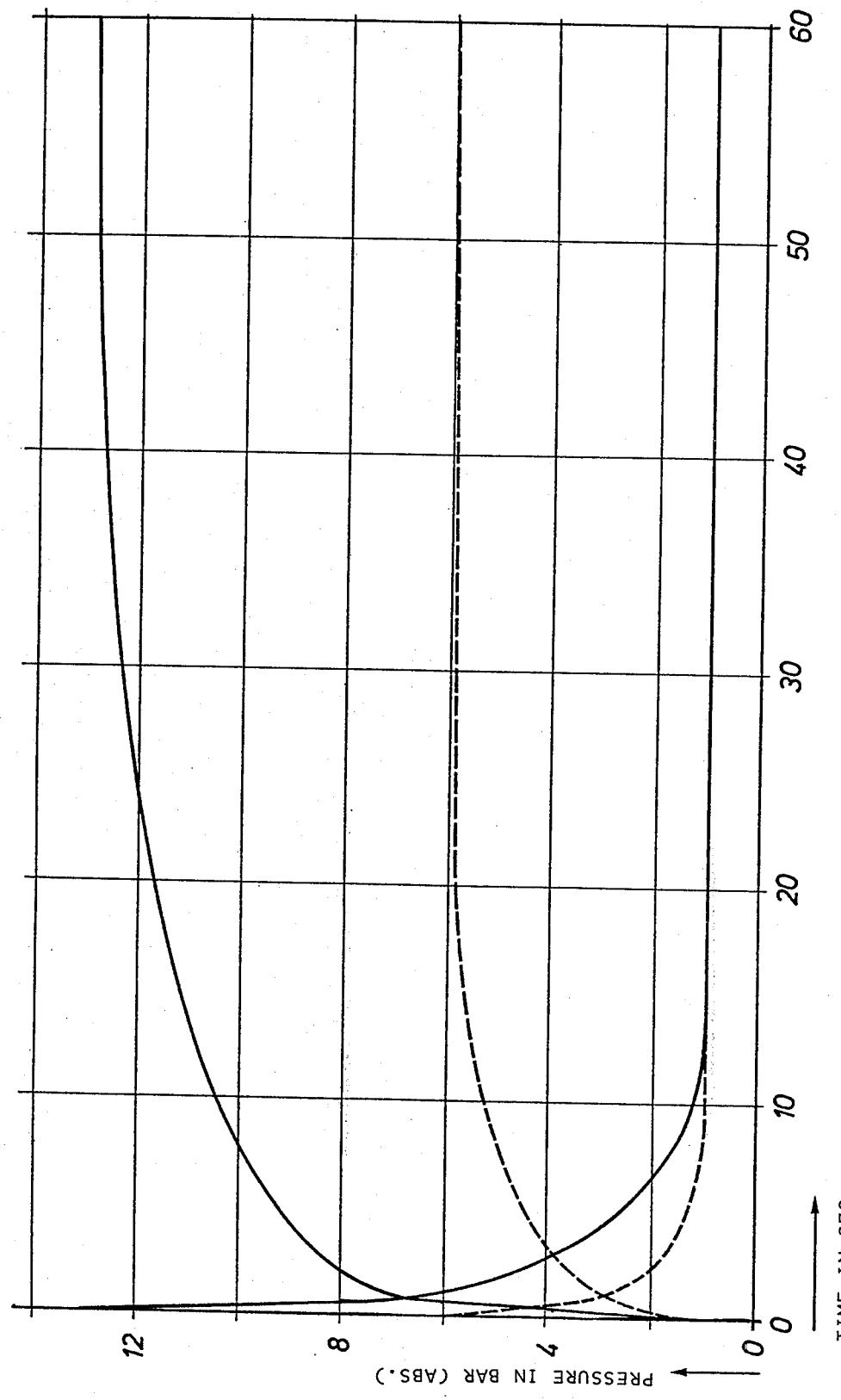
FIG. 3 is a graph, pressure vs time, for the buildup and expansion, using experimental adsorption pressures of 6.0 bar and 12.9 bar.

FIG. 3 shows the pressure curve during pressure buildup and during expansion as a function of time. The four curves each relate to a final adsorption pressure of 12.9 bar and/or to a final regenerating pressure of 1 bar (curves in full lines) and to a final adsorption pressure of 6.0 bar and a final regenerating pressure of 1 bar (dashed-line curves).

As can be seen from the curves, very rapid pressure rises and drops, respectively, take place at the beginning of the adsorption and regeneration, whereas the pressure during adsorption then rises substantially more gradually, and the final adsorption pressure is reached only approximately in the middle of the adsorption period or even toward the end of this period.

The invention is described in the aforementioned example with reference to a battery of two adsorbers. However, the scope of the present invention contemplates the possibility of using, in place of two adsorbers, also three or more adsorbers, and of distributing the individual cycle sequences among these. In particular, it is also within the scope of this invention to conduct the adsorption simultaneously in several, parallel-connected adsorbers which are, however, chronologically staggered to a minor extent; this variant of the process contributes toward making the delivery pressure of the product more uniform.

TABLE I

| Experiment | | 1 | 2 | 3 | 4 | 5 | 6 | 7 | 8 | 9 | 10 | 11 | 12 |
|---|---|---|---|---|---|---|---|---|---|---|---|---|---|
| Throughflow Quantity of Feed Gas | Nl/h | 195 | 210 | 245 | 300 | 365 | 430 | 420 | 490 | 590 | 620 | 730 | 950 |
| Pressure After First Pressure Buildup (Pressure Equalization) | bar | 2.5 | 2.5 | 2.5 | 3.5 | 3.5 | 3.5 | 4.5 | 4.5 | 4.5 | 7.0 | 7.0 | 7.0 |
| Pressure After Second Pressure Buildup | bar | 3.0 | 3.0 | 3.0 | 4.3 | 4.3 | 4.3 | 5.7 | 5.7 | 5.7 | 9.0 | 9.0 | 9.0 |
| Final Pressure (Adsorption) | bar | 4.0 | 4.0 | 4.0 | 6.0 | 6.0 | 6.0 | 8.0 | 8.0 | 8.0 | 12.9 | 12.9 | 12.9 |
| Product Quantity ($N_2$) | Nl/h | 30 | 43 | 76 | 40 | 94 | 160 | 70 | 136 | 232 | 80 | 180 | 370 |
| Residual $O_2$ Content in the Product | Vol-% | 0.2 | 1.0 | 3.0 | 0.2 | 1.0 | 3.0 | 0.2 | 1.0 | 3.0 | 0.2 | 1.0 | 3.0 |
| Product Yield | % | 19.4 | 25.7 | 38.1 | 16.8 | 32.3 | 45.7 | 21.1 | 34.8 | 48.3 | 16.3 | 30.9 | 47.8 |

TABLE II

| Experiment | | 13 | 14 | 15 | 16 | 17 | 18 |
|---|---|---|---|---|---|---|---|
| Throughflow Quantity of Feed Gas | Nl/h | 145 | 190 | 245 | 290 | 360 | 470 |
| Pressure After First Pressure Buildup (Pressure Equalization) | bar | 1.0 | 1.0 | 1.0 | 2.0 | 2.0 | 2.0 |
| Pressure After Second Pressure Buildup | bar | 1.3 | 1.3 | 1.3 | 2.7 | 2.7 | 2.7 |
| Pressure at End of Adsorption | bar | 2.0 | 2.0 | 2.0 | 4.0 | 4.0 | 4.0 |
| Pressure at End of Regeneration | mbar | 80 | 80 | 80 | 185 | 185 | 185 |
| Amount of Product ($N_2$) | Nl/h | 32 | 70 | 122 | 80 | 140 | 236 |
| Residual $O_2$ Content in Product | Vol-% | 0.2 | 1.0 | 3.0 | 0.2 | 1.0 | 3.0 |
| Product Yield | % | 27.9 | 46.2 | 61.1 | 34.8 | 48.7 | 61.7 |

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a pressure swing adsorption process for the separation of a gaseous mixture comprising conducting the gaseous mixture under pressure over a carbon molecular sieve adsorbent in a pressurized adsorber having an inlet and an outlet, said adsorbent being capable of adsorbing at least one component selectively over the other components; discharging from said outlet a gaseous stream enriched in one or more other components; lowering the pressure above the adsorbent for regenerating purposes wit liberation of a gaseous stream enriched in at least the one component; repressurizing the adsorber; and repeating the cycle thereover, the improvement which comprises conducting said repressurizing in at least two stages, wherein the pressure buildup in the first stage or stages to an intermediate pressure is effected relatively rapidly, and the pressure buildup in the last stage to the final adsorption pressure is conducted substantially more gradually, said improvement resulting in the diminution of a surge of undesired component in the initial stream discharged from the repressurized bed.

2. A process according to claim 1, wherein the pressure buildup in the last stage is conducted with unseparated gaseous mixture passed in to the inlet of the adsorber.

3. A process according to claim 2, wherein during the pressure buildup in the last stage, a gaseous stream enriched in one or more other components is discharged from the outlet of the adsorber.

4. A process according to claim 3, wherein the end of the pressure buildup in the last stage coincides with the end of the adsorption cycle.

5. A process according to claim 2 comprising a three-stage pressure buildup, the pressure buildup in the second stage also being conducted by passing unseparated gaseous mixture into the adsorber.

6. A process according to claim 1, wherein a complete cycle is conducted in about 2 minutes, the pressure buildup in the first stages is conducted in 2 to 5 seconds, and the pressure buildup on the last stage is conducted in 20 to 30 seconds.

7. A process according to claim 1, wherein a complete cycle is conducted in about 2 minutes, the pressure buildup in the first stages is conducted in 2 to 5 seconds and the pressure buildup in the last stage is conducted in 20 seconds up to the end of the adsorption cycle.

8. A process according to claim 1, wherein the pressure ratio between the adsorption pressure and the desorption pressure is 4:1 to 8:1.

9. A process according to claim 1, wherein the pressure ratio between the adsorption pressure and the desorption pressure is 4:1 to 20:1.

10. A process according to claim 1, wherein the pressure ratio between the adsorption pressure and the desorption pressure is about 20:1 to 60:1.

11. A process according to claim 1, wherein in the first stage or stages the pressure is increased to 40 to 70% of the total adsorption pressure in 3 to 10% of the total time, and in the second stage the pressure is increased to 70 to 100% of the total adsorption pressure in 30 to 85% of the total time, and in the third stage the final adsorption pressure is achieved in 70 to 15% of the total time.

12. A process according to claim 11, wherein the total repressurization occurs in 5 to 60 seconds.

13. A process according to claim 12, wherein the total repressurization occurs in 30 to 60 seconds.

14. A process according to claim 1, wherein the gaseous mixture comprises air and wherein oxygen is preferentially adsorbed over the carbon molecular sieve adsorbent, thereby producing nitrogen-enriched gas.

15. A process according to claim 14, wherein the nitrogen enriched gas has a residual oxygen content of 0.1 to 5% by volume.

16. A process according to claim 1, wherein the adsorption pressure is 2 to 14 bars.

17. A process according to claim 16, wherein the adsorption pressure is 4 to 10 bars.

* * * * *